(12) United States Patent
Neerman (10) Patent No.: US 9,469,365 B2
(45) Date of Patent: Oct. 18, 2016

(54) TRICYCLE

(71) Applicant: N.G.M. SPRL, Kortrijk (BE)

(72) Inventor: Johan Neerman, Kortrijk (BE)

(73) Assignee: N.G.M. SPRL, Kortrijk (BE)

( * ) Notice: Subject to any disclaimer, the term of this patent is extended or adjusted under 35 U.S.C. 154(b) by 0 days.

(21) Appl. No.: 14/774,676

(22) PCT Filed: Mar. 10, 2014

(86) PCT No.: PCT/IB2014/059589
§ 371 (c)(1),
(2) Date: Sep. 10, 2015

(87) PCT Pub. No.: WO2014/141042
PCT Pub. Date: Sep. 18, 2014

(65) Prior Publication Data
US 2016/0023710 A1 Jan. 28, 2016

(30) Foreign Application Priority Data

Mar. 11, 2013 (BE) .................................. 2013/0156

(51) Int. Cl.
*B62K 15/00* (2006.01)
*B62H 1/04* (2006.01)
*B62H 1/12* (2006.01)
*B62K 3/00* (2006.01)
(Continued)

(52) U.S. Cl.
CPC ............... *B62K 15/006* (2013.01); *B62H 1/04* (2013.01); *B62H 1/12* (2013.01); *B62K 3/002* (2013.01); *B62K 5/02* (2013.01); *B62K 5/025* (2013.01); *B62K 2015/005* (2013.01)

(58) Field of Classification Search
CPC ............ B62K 5/10; B62K 5/00; B62K 5/02; B62K 5/023; B62K 2005/001; B62K 15/00; B62K 2015/005; B62K 15/006; B62K 3/002; B62K 5/025; B62J 1/005; B62J 1/007; B62J 1/28; B62J 25/00; B62J 3/002; B62J 5/06; B62J 1/00; B62H 1/00; B62H 1/04
See application file for complete search history.

(56) References Cited

U.S. PATENT DOCUMENTS

| 5,240,267 A * | 8/1993 | Owsen | B62K 5/10 |
| | | | 280/124.103 |
| 2006/0022422 A1* | 2/2006 | Tasma | B62K 5/027 |
| | | | 280/124.135 |
| 2007/0096427 A1* | 5/2007 | Knaub | A61G 5/042 |
| | | | 280/304.1 |

(Continued)

FOREIGN PATENT DOCUMENTS

DE   202011002811 U1   4/2011

OTHER PUBLICATIONS

International Search Report dated Apr. 24, 2014.

*Primary Examiner* — John Walters
*Assistant Examiner* — Brian Swenson (57) ABSTRACT

A folding tricycle (1) for transporting a person, wherein the tricycle (1) comprises a front wheel (2), two rear wheels (3) and a frame joining the wheels (2, 3) wherein the frame comprises two arms (7) that carry the rear wheels (3). The arms (7) are connected to the rest of the frame in such a manner that the arm (7) can adopt different positions relative to the rest of the frame. The width and length of the tricycle (1) are therefore adjustable. In all positions of the arms (7), the 10 planes wherein the rear wheels (3) are located are substantially parallel to the longitudinal axis of the tricycle (1), and the tricycle (1) can be driven.

15 Claims, 5 Drawing Sheets

(51) Int. Cl.
 *B62K 5/02* (2013.01)
 *B62K 5/025* (2013.01)

(56) References Cited

U.S. PATENT DOCUMENTS

| | | | |
|---|---|---|---|
| 2007/0152422 A1* | 7/2007 | Lin | B62K 5/10 |
| | | | 280/275 |
| 2007/0170666 A1 | 7/2007 | Chen | |
| 2008/0001374 A1 | 1/2008 | Liao | |
| 2009/0115160 A1* | 5/2009 | Chiu | B62K 15/008 |
| | | | 280/278 |
| 2009/0115168 A1 | 5/2009 | Liao | |
| 2009/0224495 A1 | 9/2009 | Anderson | |
| 2013/0193668 A1* | 8/2013 | Decker | B62K 5/06 |
| | | | 280/261 |
| 2015/0158360 A1* | 6/2015 | Uebayashi | B60G 3/26 |
| | | | 280/5.508 |
| 2015/0298764 A1* | 10/2015 | Edlund | A61H 3/04 |
| | | | 180/206.2 |

* cited by examiner

TRICYCLE

This application claims the benefit of Belgian patent application No. BE20130156, filed Mar. 11, 2013, which is hereby incorporated by reference in its entirety.

FIELD OF THE INVENTION

The present invention relates to a folding tricycle for transporting a person, comprising:
- a front wheel, arranged substantially in the longitudinal axis of the tricycle;
- two rear wheels;
- a folding frame joining the wheels;
- wherein the frame comprises
- a front section joining the front wheel;
- a central section;
- a rear section joining the rear wheels;
- wherein
- the central section comprises an attachment part;
- the rear section comprises two arms, the first end of each arm is connected to said attachment part, and the second end of each arm carries a rear wheel;
- wherein said connection of each arm and the attachment part allows each arm to adopt at least two positions relative to the attachment part, in a first position, the distance between the rear wheel, which corresponds to said arm, and the longitudinal axis of the tricycle is maximum and, in a second position, the distance between said rear wheel and the longitudinal axis of the tricycle is minimal, and wherein, when the two arms are both in said first position or in said second position, the rear wheels are arranged laterally on opposite sides with respect to the longitudinal axis of the tricycle, and the tricycle is substantially symmetrical, having a plane of symmetry along the longitudinal axis of the tricycle.

The longitudinal axis of the tricycle is the axis of the conventional direction of movement of the tricycle. The longitudinal direction of the tricycle is the direction in the conventional direction of movement of the tricycle, and the length of the tricycle is the dimension of the tricycle in the conventional direction of movement of the tricycle. The length of a conventional tricycle is determined by the distance between the front wheel and the rear wheels. The axis of the conventional direction of movement of the tricycle extends substantially parallel to the support plane of the wheels of the tricycle. When driving/travelling with the tricycle, the support plane of the wheels is normally the surface of the road on which the tricycle moves. The widthwise direction of the tricycle is the direction that extends perpendicular to the longitudinal axis of the direction of movement of the tricycle, and that extends parallel to the support plane of the wheels of the tricycle. The width of the tricycle is the dimension of the tricycle according to the widthwise direction of the tricycle. The width of a conventional tricycle is determined by the distance between the rear wheels.

A large distance between the front wheel and the rear wheels means the tricycle is long in length; a large distance between the rear wheels means the tricycle is wide in width.

BACKGROUND

A tricycle is often preferred over other vehicles such as bicycles due to its stability. Owing to its two rear wheels, a tricycle is very stable, and the risk of falling over with a tricycle is minimal. This is very useful especially in a stationary position, when not operating the tricycle, for example when stopped at a red light, since one does not have to get off the tricycle or place a foot on the road on which the tricycle is being operated.

There are, however, disadvantages associated with tricycles. When storing the tricycle, it is important that the tricycle does not take up much space. For storage purposes, it is desirable that the length and the width are as small as possible. When the tricycle is being used, thus when riding the tricycle, the two rear wheels are arranged laterally on opposite sides with respect to the longitudinal axis of the tricycle. The greater the distance/space between the rear wheels in the widthwise direction of the tricycle, the greater the stability of the tricycle. In the majority of tricycles, the space between the rear wheels and the space between the front wheel and the rear wheels, and thus the width and length of the tricycle, are not adjustable. A tricycle having a certain length thus occupies more space than a bicycle of said same length because a bicycle has a single rear wheel, and therefore the width of the bicycle is less than the width of the tricycle.

A solution to this storage problem is described in document EP 1937541. Document EP 1937541 discloses a folding tricycle comprising a front wheel, two rear wheels and a folding frame. The advantage of a folding frame is that the dimensions of the frame and therefore the tricycle can be adjusted. It is therefore possible to reduce the dimensions when storing the tricycle. The frame comprises two arms, and each arm carries a rear wheel. Each arm is connected to the rest of the frame in order to able to assume at least two positions. In a first position, the position of use, if the tricycle is driven, the distance between the two rear wheels and the distance between the front wheel and two rear wheels is maximum, the dimensions, the length and the width, of the tricycle are thus maximum. This enhances the stability of the tricycle. In a second position, the storage position, the distance between the two rear wheels and the distance between the front wheel and two rear wheels is minimal, therefore the dimensions of the tricycle are minimal. The drawback of this tricycle is that the tricycle cannot be driven or that it is impossible to roll when it is in the storage position. In a storage space, it is often necessary to move the tricycle to the desired location while the tricycle is in its storage position. For the tricycle described in EP 197541, this proves to be difficult because one must lift or drag the tricycle. This manoeuvre is very difficult with a slightly heavier tricycle.

In some instances it is desirable that the width of the tricycle be smaller during operation. In narrow passageways or in heavy traffic, it is often desirable that there is not much space between the rear wheels. If the rear wheels are closer together, the tricycle can be used in narrow passageways and in heavy traffic. Nevertheless, for the tricycle described in EP 1937541, if the distance between the rear wheels is reduced, it is no longer possible to ride the tricycle.

Other solutions to the problem of storing tricycles are described in documents US 2009/0115168 and DE 20 2011 002 811. However, these tricycles are not suitable for transporting a person, and in their storage position they no longer rest on their three wheels. Thus, they can no longer be used as a tricycle in their storage position. The tricycle described in US 2009/0224495 also solves the problem of storage, but this tricycle is not adapted to transport a person and in its storage position it is no longer able to perform its function, that of transporting a load.

The width of the tricycles described in documents US 2008/0001374 and US 2007/017066 is adjustable. However, if the width decreases, the length increases, and vice versa such that they do not truly have a compact position and the problem of storage still remains.

SUMMARY

The object of the invention is therefore to provide a tricycle wherein it is possible to reduce the dimensions of the tricycle, wherein the width and length are thus adjustable without compromising the ability to use the tricycle to drive/ride.

This objective can be achieved by producing a folding tricycle for transporting a person, comprising:
- a front wheel arranged substantially in the longitudinal axis of the tricycle;
- two rear wheels;
- a folding frame joining the wheels;
- wherein the frame comprises
- a front section joining the front wheel;
- a central section;
- a rear section joining the rear wheels;
- wherein
- the central section comprises an attachment part;
- the rear section comprises two arms, the first end of each arm is connected to said attachment part, and the second end of each arm carries a rear wheel;
- wherein said connection of each arm and of the attachment part allows each arm to adopt at least two positions relative to the attachment part, in a first position, the distance between the rear wheel, which corresponds to said arm, and the longitudinal axis of the tricycle is maximum and, in a second position, the distance between said rear wheel and the longitudinal axis of the tricycle is minimal, wherein, when the two arms are in said first position or said second position, the rear wheels are arranged laterally on opposite sides with respect to the longitudinal axis of the tricycle, and the tricycle is substantially symmetrical, having a plane of symmetry along the longitudinal axis of the tricycle, wherein said connection is designed in such a way that it also enables the distance between the front wheel and said rear wheel to be modified, and that in all positions of the arms, the planes, wherein the rear wheels are located, are substantially parallel to the longitudinal axis of the tricycle and wherein said connection of each arm and the attachment part comprises an intermediate part, the first end of said arm being connected against the attachment by means of said intermediate part, and
  - each intermediate part is rotatably connected to the attachment part in such a way that each intermediate part can rotate relative to a rotation axis of the intermediate parts that extends perpendicularly to the plane of symmetry of the tricycle;
  - each arm is pivotally connected to the corresponding intermediate part in such a way that the arm can rotate relative to an axis of rotation that extends parallel to the plane of symmetry of the tricycle.

In all positions of the arms, the rear wheels are substantially parallel to the longitudinal axis of the tricycle. The rear wheels need not be parallel to one another. When the tricycle is substantially symmetrical, having a plane of symmetry along the longitudinal axis of the tricycle, the distance between each rear wheel and the front wheel is substantially equal. The possibility of using the tricycle to ride is not compromised because in all positions of the arms, the rear wheels are parallel to the axis of the conventional direction of movement of the tricycle, in such a manner that when rolling with the tricycle, the rear wheels roll in the same direction. This means that in all positions of the arms, it is possible to drive/ride the tricycle, thus if the width and length of the tricycle is minimal, when the tricycle is suitable to be stored, the tricycle can be rolled to the desired location in the storage area, or the tricycle can be driven to the desired location in the storage area. It is not necessary to lift or drag the tricycle.

Normally the width and length of the tricycle are maximum when the tricycle is being driven, as a tricycle having large dimensions is more stable. But if one wants to use the tricycle to pass through narrow passageways or in heavy traffic, it is preferable that the width of the tricycle is reduced. The width of the tricycle according to the invention can be reduced without compromising the user's ability to ride the tricycle. Here, it is possible to change between at least two positions of the arms, where when each arm is in its first position, the width of the tricycle is maximum, and wherein when each arm is in its second position, the width of tricycle is minimal.

Each arm can execute two movements relative to the attachment part. The first movement is a movement in the longitudinal direction of the tricycle. This movement is possible because each intermediate part can rotate relative to the rotation axis of the intermediate parts which extend perpendicularly to the plane of symmetry of the tricycle and because each arm is connected to the corresponding intermediate part. When the corresponding intermediate part of the arm rotates relative to the rotation axis of the intermediate parts, the arm that supports the corresponding rear wheel moves towards the front or towards the rear of the tricycle. Therefore, the distance between the front wheel and said rear wheel is adjustable. If both arms move, the length of the tricycle can be changed.

The second movement is a movement in the widthwise direction of the tricycle. This movement is possible because each arm is pivotally connected to the corresponding intermediate part in such a manner that the arm can rotate relative to a rotation axis that extends parallel to the plane of symmetry of the tricycle. When the arm carrying the corresponding rear wheel rotates relative to said rotation axis, the arm makes a movement in the widthwise direction of the tricycle, thus said rear wheel moves toward or away from the other rear wheel. Therefore, the width of the tricycle can be modified with said second movement.

Owing to the two movements described above, the dimensions of the tricycle can be adjusted. Furthermore, with the positions of the two rotation axes, one of which extends perpendicularly to the plane of symmetry of the tricycle and the other extends parallel to the plane of symmetry of the tricycle, the rear wheels can only perform movements perpendicular to the plane of symmetry of the tricycle or parallel to the plane of symmetry of the tricycle. This means that a wheel that is parallel to the longitudinal axis of the tricycle is obliged to remain parallel to the longitudinal axis of the tricycle.

An additional advantage is that it is possible to modify the width and length of the tricycle independently. For storage purposes, it is desirable that the width and length be reduced, but in order to ride through narrow passageways or in heavy traffic, it is preferable that only the width be reduced so as not to compromise the stability of the tricycle. This is possible here.

Preferably, in said first position of the arms, the plane, wherein the corresponding rear wheel is located, intersects the plane of symmetry of the tricycle at a height which lies above said rear wheel. When the two arms are in the first position, the tricycle provides greater manoeuvrability when the rear wheels are inclined, as described above.

The tricycle preferably comprises locking means for blocking said arm with respect to said corresponding intermediate part. In this manner, there is no risk that said arm can move in the widthwise direction of the tricycle while it is being driven. The locking means improve the safety of the tricycle during use.

More preferably, the locking means comprises a protruding part that is part of said intermediate part, and a hole of said arm which corresponds to the protruding part, or vice versa, such that in the first position of said arm, the protruding part is housed inside the hole. In the first position of the arm, the distance between the rear wheel, which corresponds to said arm, and the longitudinal axis of the tricycle is maximum. The arms may be positioned in other positions, where the distance between said rear wheel and the longitudinal axis of the tricycle is maximum, and the protruding part is also housed inside the hole in these other positions. While driving the tricycle, the width of the tricycle is normally maximum. It is therefore very important that the arms be locked relative to said corresponding intermediate parts. By inserting a protruding part into a hole, on obtains a sufficiently solid and rugged clamping while driving. This connection can be easily detached by hand. A connection is thus obtained that is sufficiently strong, but which can be detached by an adult. Of course other connections are possible, such as a threaded connection, for example. Of course, it is also possible to have locking means that also block said arm relative to the corresponding intermediate part in the second position of the arm, or which blocks said arm relative to the corresponding intermediate part in other positions of the arm.

Preferably, according to a specific embodiment, the tricycle also comprises locking means for blocking the intermediate part relative to the attachment part. In this manner, there is no risk that said arm can move in the lengthwise direction of the tricycle while it is being driven. These locking means improve the safety of the tricycle during use.

More preferably, according to a more specific embodiment, the attachment part has two surfaces, wherein the planes of the two surfaces extend parallel to each other at equal distances from the plane of symmetry of the tricycle, and extend parallel to the plane of symmetry of the tricycle, and the intermediate parts are connected rotatably to said corresponding surfaces of the attachment part. The planes of said two surfaces extend parallel to on other at equal distances from the plane of symmetry of the tricycle, and extend parallel to the plane of symmetry of the tricycle, because in this way it is easy to connect the intermediate parts rotatably to said surfaces, such that each intermediate part is rotatable relative to the axis of rotation of the intermediate parts. The intermediate parts are connected to said surfaces. A connection to a solid element, such as a surface, is easy to establish, and this connection is strong and will not break easily while the tricycle is in use.

Preferably, the surfaces of the attachment part are circular surfaces having the same dimensions, and the intermediate parts have circular surfaces having said same dimensions which are formed so as to permit shape adjustment with said surfaces of the attachments part, and the intermediate parts are connected to said corresponding surfaces of the attachment part around a pivot that is located at the centre of said corresponding surfaces of the attachment part. The circular surfaces having the same dimensions can be turned easily when the pivot is in the centre of said surfaces. The intermediate parts entirely cover both surfaces in various positions of rotation. This configuration is aesthetically attractive.

Ideally, each arm has connecting surfaces, and each intermediate part has connecting surfaces complementary to the connecting surfaces of the arms, and each arm is pivotally connected by a hinge pin to the corresponding intermediate part, in which the hinge pin is located on the outer edge of the connecting surface of the arm and, in said first position of the arms, said connecting surfaces of the arms and said connecting surfaces of the intermediate parts are placed against each other.

The arms can be placed in other positions, where the distance between the rear wheel, which corresponds to said arm, and the longitudinal axis of the tricycle is maximum, and wherein said connecting surfaces of the arms and said connecting surfaces of the intermediate parts are also placed one against the other. The arm is pivotally connected to the corresponding intermediate part in such a manner that the arm can rotate relative to an axis of rotation that extends parallel to the plane of symmetry of the tricycle. The hinge pin permits this movement. While pivoting about the hinge pin, the arm rotates relative to the axis of rotation that extends parallel to the plane of symmetry of the tricycle. Given that the hinge pin is located on the outer edge of the surface of the arm, the connecting surface of the arm moves towards or away from said connecting surface of the corresponding intermediate part during a rotation of the arm relative to this axis of rotation. If the hinge pin is not located on the outer edge of the surface of the arm, a part of the connecting surface of the arm must always move toward said connecting surface of the corresponding intermediate part, and also a part of the surface of the arm must always move away from said connecting surface of the corresponding intermediate part during a rotation of the arm with respect to this axis of rotation. This, of course, complicates said rotation. The connecting surfaces of the arms and the connecting surfaces of the intermediate parts are also complementary. There is therefore a position wherein said connecting surfaces of the arms and said connecting surfaces of the intermediate parts are placed against each other. Here it is in the first position of said arm where the distance between the rear wheel, which corresponds to said arm, and the longitudinal axis of the tricycle, is maximum. The tricycle is most often used for driving when both arms are in the first positions of the arms. When said connecting surfaces of the arms and said connecting surfaces of the intermediate parts are placed against each other, it is easier to block the arms relative to the corresponding intermediate part using locking means.

In particular, according to a preferred embodiment, the intermediate parts are connected by a bar. If one wants to shorten the length of the tricycle, the two arms must be moved, in the lengthwise direction of the tricycle, towards the front wheel. When the intermediate parts are connected by a bar, one simply needs to move one of the two arms towards the front wheel. At the same time, the other arm also performs the movement towards the front wheel. This allows the length of the tricycle to be shortened quickly and easily. In this manner, the tricycle also still substantially has a plane of symmetry along the longitudinal axis of the tricycle, when the distance between each rear wheel and the longitudinal axis of the tricycle is equal, because the distance between the front wheel and each rear wheel remains equal. The tricycle is stable because it has substantially a plane of symmetry along the longitudinal axis of the tricycle.

Alternatively, the arms can move independently in the lengthwise direction of the tricycle.

Said bar is preferably located at a certain distance from the axis of rotation of the intermediate parts, and said surfaces of the attachment part comprise slots at said distance from the axis of rotation of the intermediate parts to ensure the connection between the bar and the intermediate parts, and to ensure the rotation of the intermediate parts relative to the axis of rotation of intermediate parts, in which the dimensions of the slots are limited so as to limit the rotation. In this manner, it is possible to limit the movement of the arms in the lengthwise direction of the tricycle. The movement of the arm, to reduce/increase the length of the tricycle, cannot be too large in order so as to prevent the rear wheels from losing contact with the road/ground on which the tricycle is moving. If the rear wheels are no longer in contact with the road/ground, the tricycle cannot be driven. In all positions, it is desirable that the rear wheels touch the road/ground.

More preferably, the attachment part comprises a clamp for blocking the bar in the desired position. In this manner, there is no risk that said arm can move in the lengthwise direction of the tricycle while it is being driven. The clamp enhances the safety of the tricycle during use.

In a preferred embodiment, each arm is preferably detachably connected to the corresponding intermediate part. If one wishes to store the tricycle, it is rolled/driven to the desired location in the storage area. The arms can be detached so that the tricycle occupies even less space. Another advantage is that it is possible to mount different arms on the tricycle.

In a more preferred embodiment, the frame comprises a stand. With this stand, it is possible to raise the frame and the rear wheels at the same time in such a manner that the rear wheels no longer touch the road/ground on which the tricycle moves. It is desirable that all movement of an arm or arms should be as easy as possible. When the rear wheels touch the road/ground, friction occurs between the rear wheels and the road/ground. This friction complicates and prevents displacement of the arm. This friction can be eliminated with a stand.

Preferably, the stand is a central stand. In this manner, the tricycle can be raised on both sides of the frame, in the widthwise direction. This will strengthen the stability of the tricycle, and each arm is raised to the same height.

More preferably, the central stand comprises two wheels, wherein the two wheels are located at the base of the tricycle when the central stand raises the frame. When the stand is located at the base of the tricycle, this means that the tricycle is supported by these wheels, and it is possible to roll the tricycle. This is very useful when the arms are detachably connected to the attachment part, because in this way it is possible to roll the tricycle when the arms are detached from the tricycle.

BRIEF DESCRIPTION OF THE DRAWINGS

The present invention will now be explained in greater depth based on the following description of tricycles according to the invention. The purpose of this description is exclusively to give an illustrative example of the invention and to indicate further advantages and details of these tricycles according to the invention, and may thus in no way be interpreted as a limitation of the scope of application of the invention or of the patent rights requested in the claims.

This detailed description will use reference numerals to refer to the appended drawings, wherein.

DETAILED DESCRIPTION OF EMBODIMENTS

The folding tricycle (1) that is shown in FIGS. 3 to 7 comprises a front wheel (2), arranged substantially in the longitudinal axis of the tricycle (1), two rear wheels (3), arranged laterally on opposite sides relative to the longitudinal axis of the tricycle (1), and a folding frame joining the wheels (2, 3). In FIGS. 3 to 7, only a single rear wheel (3) is shown, and the rear wheel (3) is supported by an arm (7) of the frame of the tricycle (1). The length of the tricycle (1) is determined by the distance between the front wheel (2) and rear wheels (3). The width of the tricycle (1) is determined by the distance between the rear wheels (3).

The folding frame of the tricycle (1) comprises a front section (5) joining the front wheel (2), a central section (6a, 6b) and two arms (7) joining the rear wheels (3). The central section (6a, 6b) comprises a first section (6a) that supports a footrest, and an arcade (6b) that extends perpendicularly to the supporting plane of the wheels (2, 3) and which supports an ischiatic support, and wherein the uppermost part of the arcade (6b) is the attachment part (8). The first end (25) of each arm (7) is connected to said attachment part (8), and the second end of each arm (7) carries a rear wheel (3). The driver of the tricycle (1) normally presses on the ischiatic support and footrest. The arms (7) are arcuate in shape. In this manner, arms (7) of a height are obtained that can be connected to the rest of the frame, without excessive width between the two rear wheels (3).

Each arm (7) is connected to the attachment part (8), such that the width of the tricycle (1) (the distance between the rear wheels (3)), and the length of the tricycle (1), (the distance between the front wheel (2) and rear wheels (3)) is suitable for moving said arm (7) relative to the attachment part (8). In the first position of the arm (7), the distance between the rear wheels (3), which corresponds to said arms (7), is maximum, and the distance between the front wheel (2) and said rear wheels (3) is maximum and, in its second position, the distance between said rear wheels (3) is minimal, and the distance between said rear wheels (3) and the front wheel (2) is minimal. When the two arms (7) are both located in said first position or in said second position, the rear wheels (3) are arranged laterally on opposite sides relative to the longitudinal axis of the tricycle (1), and the tricycle (1) has a plane of symmetry substantially along the longitudinal axis of the tricycle (1). When the two arms (7) are both located in said first position of the arms (7), the planes of the rear wheels (3) intersect at a height which lies above the rear wheels (3). In this manner, the manoeuvrability and stability of said first position of the arms (7) are significant.

The planes wherein the rear wheels (3) are located are, independent of the length and width of the tricycle (1), substantially parallel to the longitudinal axis of the tricycle (1). In this manner, it is possible to drive/ride with the tricycle (1) regardless of the length and width of the tricycle (1).

The tricycle (1) shown in FIGS. 3 to 7 is more specifically a tricycle (1) propelled either by pushing off the ground with the foot, or by a motor. Other tricycles (1) are nevertheless possible.

Figure 1:
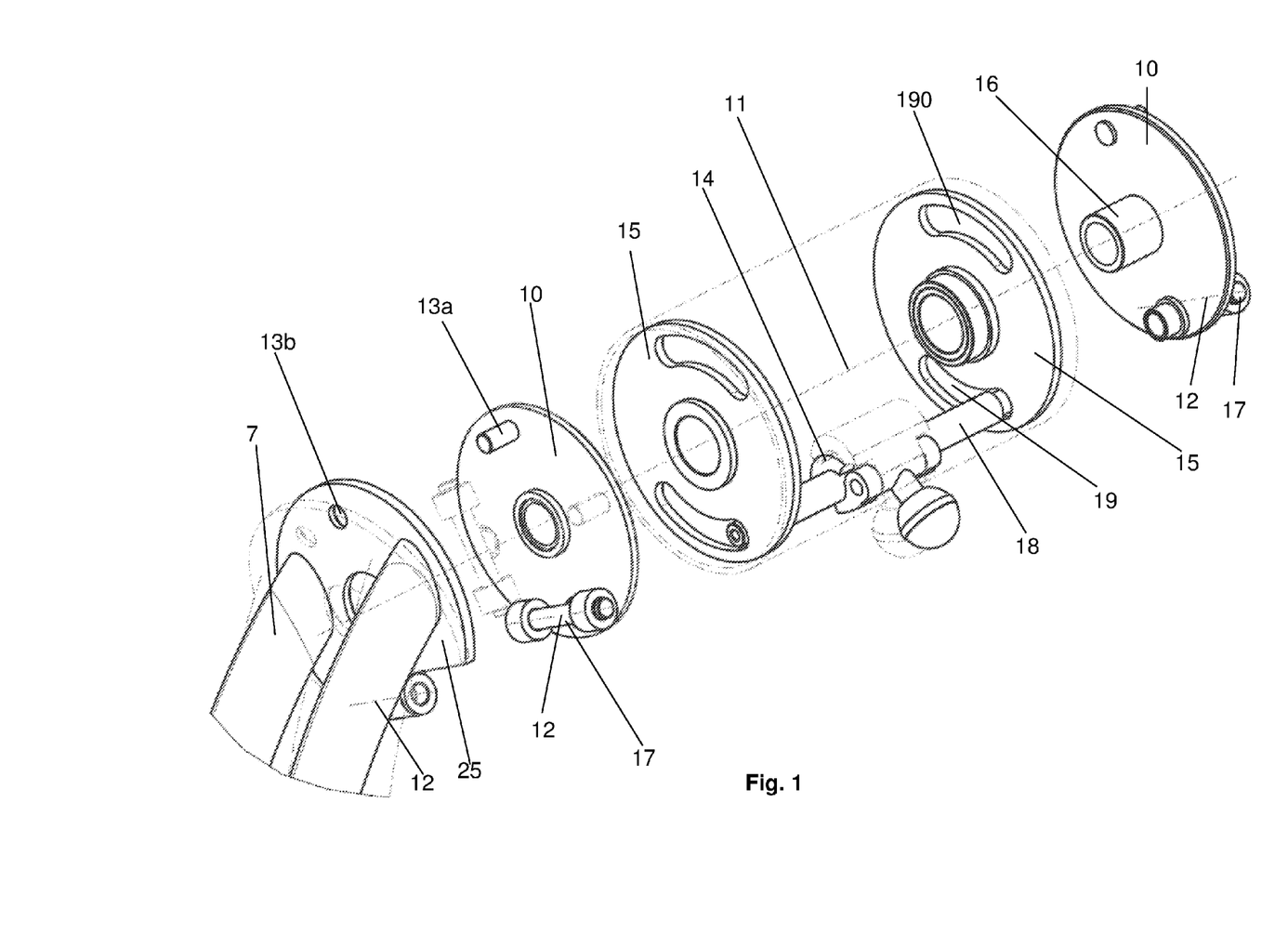
FIG. 1 is an exploded view of a part of the tricycle of a preferred embodiment according to the invention, wherein the attachment part, the intermediate parts and part of one of the two arms can be seen.
Figure 2:
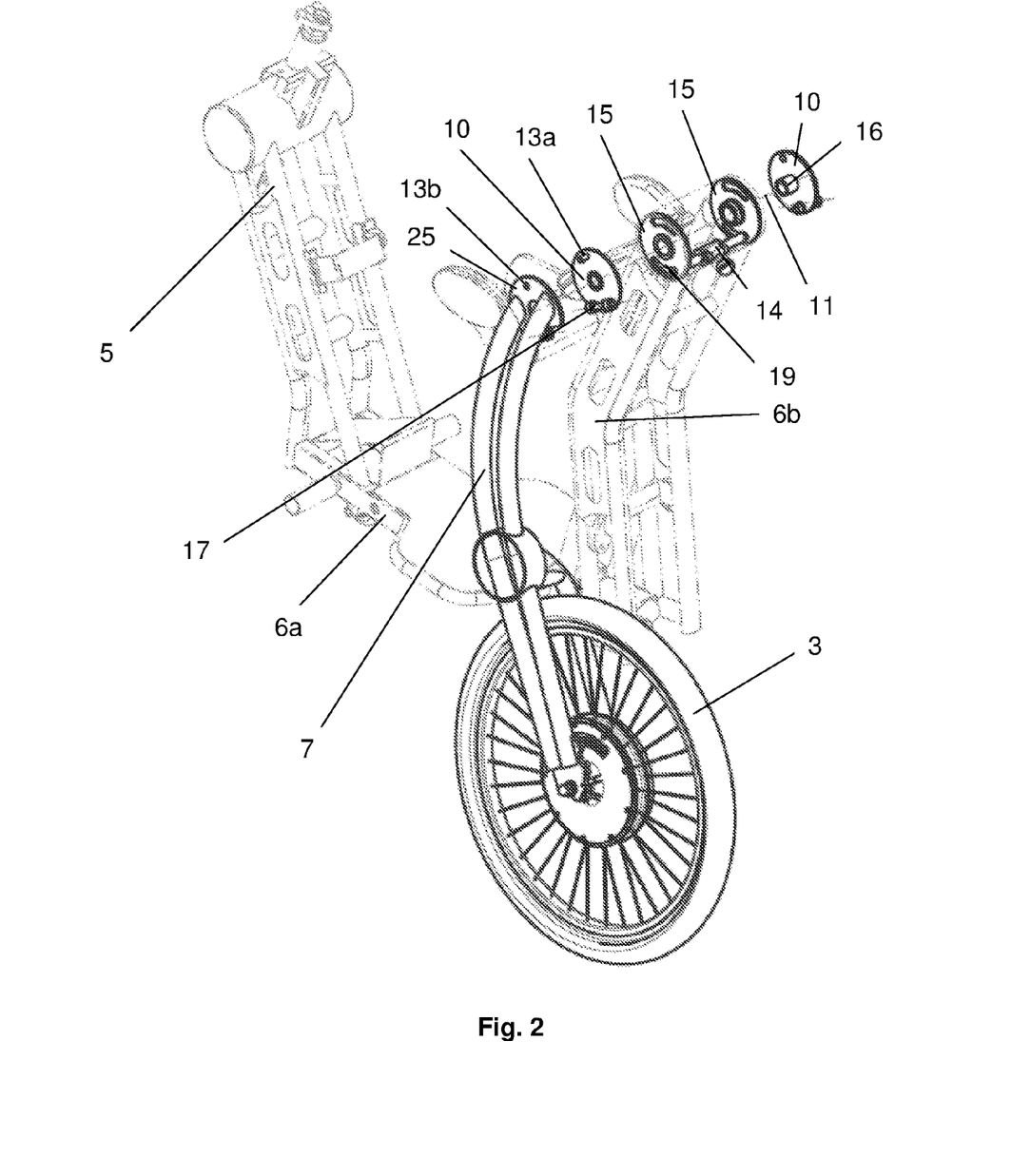
FIG. 2 is an exploded view of a part of the preferred embodiment of the tricycle, wherein the frame, the intermediate parts and one of the two arms can be seen.
Figure 3:
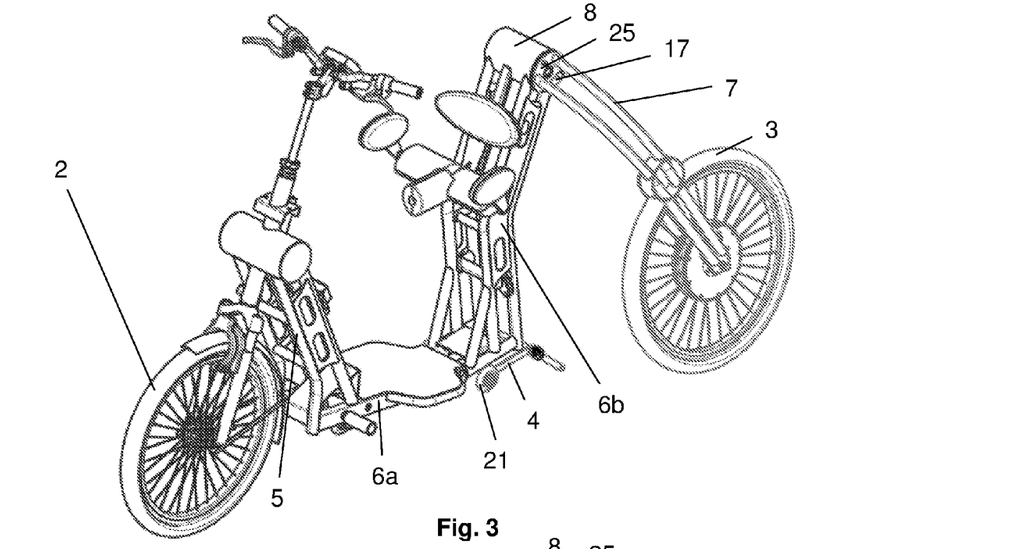
FIG. 3 is a perspective view of the preferred embodiment of the tricycle, wherein one of the two arms is shown, and wherein these arms are in a first position, where the distance between the corresponding rear wheel and the longitudinal axis of the tricycle is maximum, and where the distance between the front wheel and said rear wheel is maximum.

The attachment part (8) has two surfaces (15), where the planes of the two surfaces (15) extend parallel to each other at equal distances from the plane of symmetry of the tricycle (1), and extend parallel to the plane of symmetry of the tricycle (1). The connection of each arm (7) and the attachment part (8) comprises an intermediate part (10) which is located between said arm (7) and the attachment part (8) and the intermediate parts (10) are rotatably connected to said corresponding surfaces (15) of the attachment part (8) by a pivot (16), such that each intermediate part (10) is rotatable relative to the same axis of rotation (11) of the intermediate parts (10) which extend perpendicularly to the plane of symmetry of the tricycle (1). The surfaces (15) of the attachment part (8) are circular surfaces (15) having the same dimensions, and the intermediate parts (10) have circular surfaces having said same dimensions which are formed so as to allow shape adjustment with said surfaces (15) of the attachment part (8), and the intermediate parts (10) are connected to said corresponding surfaces (15) of the attachment part (8) around a pivot (16) that is located at the centre of said corresponding surfaces (15) of the attachment part (8). The intermediate parts (10) have circular surfaces having said same dimensions that are formed so to allow shape adjustment with said surfaces (15) of the attachment part (8), and the pivots (16) are located in the centre of said circular surfaces (15) of the attachment part (8). The circular surfaces (15) of the attachment part (8) are always covered by the intermediate parts (10). This configuration is aesthetically attractive.

The intermediate parts (10) are connected by a bar (18). This means that when one of the two intermediate parts (10) rotates relative to the axis of rotation (11) of the intermediate parts (10), the other intermediate part (10) performs the same movement.

The arms (7) are connected to the corresponding intermediate parts (10) such that when the intermediate parts (10) rotate relative to the axis of rotation (11) of the intermediate parts (10), the arms (7) move in the longitudinal direction of the tricycle (1). The rotation of the intermediate parts (10) relative to the axis of rotation (11) of the intermediate parts (10) changes the distance between the front wheel (2) and rear wheels (3), this rotation thus changes the length tricycle (1). Therefore, in order to be able to move the arm (7) into its second position when the arm (7) is in its first position, the intermediate parts (10) rotate with respect to the axis of rotation (11) of the intermediate parts (10) towards the front of the tricycle (1).

The bar (18) is located at a certain distance from the axis of rotation (11) of the intermediate parts (10), and the surfaces (15) of the attachment part (8) have slots (19) at said distance from the axis of rotation (11) of the intermediate parts (10) to ensure the connection between the bar (18) and the intermediate parts (10) and to ensure the rotation of the intermediate parts (10) relative to the axis of rotation (11) of the intermediate parts (10). The dimensions of the slots (19) are limited so as to limit the rotation. It is not necessary that the intermediate parts (10) be able to rotate 360° relative to the axis of rotation (11) of the intermediate parts (10) because one wants only to change the length of the tricycle (1), and furthermore it is desirable that the rear wheels (3) touch the ground/road on which the tricycle (1) moves.

Each arm (7) is pivotally connected to the corresponding intermediate part (10) by a hinge pin (17), so that each arm (7) can rotate relative to an axis of rotation (12) that extends parallel to the plane of symmetry of the tricycle (1). Each arm (7) has connecting surfaces, and each intermediate part (10) has connecting surfaces, where the connecting surfaces of the arms (7) and the connecting surfaces of the intermediate parts (10) are complementary. The hinge pin (17) is located on the outer edge of the connecting surface of the arms (7) and, in said first position of the arms (7), said connecting surfaces of the arms (7) and said connecting surfaces of the intermediate parts (10) are placed against each other. In order to move to the second position of the arms (7), the arm (7) also rotates about the hinge pin (17) away from the connecting surface of the corresponding intermediate part (10), such that said connecting surfaces of the arms (7) and said connecting surfaces of the intermediate parts (10) are no longer positioned against each other. The arms (7) can be positioned in other positions where the distance between the corresponding rear wheel (3) and the longitudinal axis of the tricycle (1) is maximum, and the distance between said rear wheel (3) and the front wheel (2) is not maximum. In these positions, the connecting surfaces of the arms (7) and said connecting surfaces of the intermediate parts (10) are also placed against each other.

Owing to the three axes of rotation (11, 12), the axis of rotation (11) of the intermediate parts (10) and the axes of rotation (12) that extend parallel to the plane of symmetry of the tricycle (1), it is possible to adjust the length and width of the tricycle (1) independently of one another.

Each arm (7) and therefore the tricycle (1) can adopt four extreme positions. In a first extreme position (see FIGS. 3 and 4), the length and width of the tricycle (1) are maximum, in a second extreme position (see FIG. 7), the length and width of the tricycle (1) are minimal, in a third extreme position (see FIG. 5), the length of the tricycle (1) is maximum and the width of the tricycle (1) is minimal, and in a fourth extreme position (see FIG. 6), the length of tricycle (1) is minimal and the width of the tricycle (1) is maximum. The arms (7) can of course be positioned in other positions between these extreme positions.

The first extreme position is the most interesting for driving with the tricycle (1) because it is the position that provides the greatest stability. However, when using the tricycle (1) in narrow passageways or in heavy traffic, the width of tricycle (1) in the first extreme position can be problematic. In order to counter this, the tricycle (1) can be placed in the third extreme position. Here the length of the tricycle (1) is maximum and the width of the tricycle (1) is minimal. The stability of the tricycle (1) in the third extreme position of the tricycle (1) is still sufficient because the length of the tricycle (1) is maximum, however, the manoeuvrability in narrow passageways or in heavy traffic is better because the width of the tricycle (1) is minimal. The second extreme position is the most interesting position when storing the tricycle (1) because in this position, the tricycle (1) does not occupy much space.

The tricycle (1) comprises a protruding part (13*a*) which is part of said intermediate part (10), and a hole (13*b*), which corresponds to the protruding part (13*a*) and which forms part of said corresponding arm (7), in order to block said arm (7) relative to said corresponding intermediate part (10) in said first position, said fourth position and in the other positions where the distance between the corresponding rear wheel (3) and the longitudinal axis of the tricycle (1) is maximum. In these positions of said arm (7), the protruding part (13*a*) is lodged inside the hole (13*b*). While driving the tricycle (1), the width of the tricycle (1) is normally at maximum. It is therefore very important that the arms (7) are locked relative to said corresponding intermediate parts (10) to ensure that said arms (7) do not move in the widthwise direction of the tricycle (1) while the tricycle (1) is being driven. The insertion of a protruding part (13*a*) in a hole (13*b*) creates a sufficiently solid and rugged clamping for driving.

Of course the tricycle (1) may comprise locking means (13*a*, 13*b*) for blocking said arm (7) relative to said corresponding intermediate part (10) in the second position of the arms (7) and/or in the other positions of the arm (7).

The tricycle (1), shown in FIGS. 1 to 7, further comprises a clamp (14) for blocking the bar (18). The clamp (14) blocks the bar (18) relative to the attachment part (8), if the tricycle (1) is in a position wherein the length of the tricycle (1) is maximum (first and third positions of the arm (7)). While driving the tricycle (1), the length of the tricycle (1) is normally maximum. It is therefore very important that the intermediate parts (10) be blocked to ensure that said arms (7) do not move in the lengthwise direction of the tricycle (1) while the tricycle (1) is being driven. The tricycle (1) can of course also include locking means (14) for blocking the bar (18) in other positions of the tricycle (1) wherein the length of the tricycle (1) is not maximum.

Each arm (7) is also detachably connected to the corresponding intermediate part (10). In this manner, it is also possible to detach the arm (7) to reduce the storage space necessary for the tricycle (1). Other arms (7) can also be mounted on the rest of the frame.

The surfaces (15) of the attachment part (8) comprises additional slots (190), such that other arms (7), where the connecting surfaces of the arms (7) and the connecting surfaces of the intermediate parts (10) are placed against each other in the second position of the arms (7), can also be attached to the attachment part (8).

Figure 4:
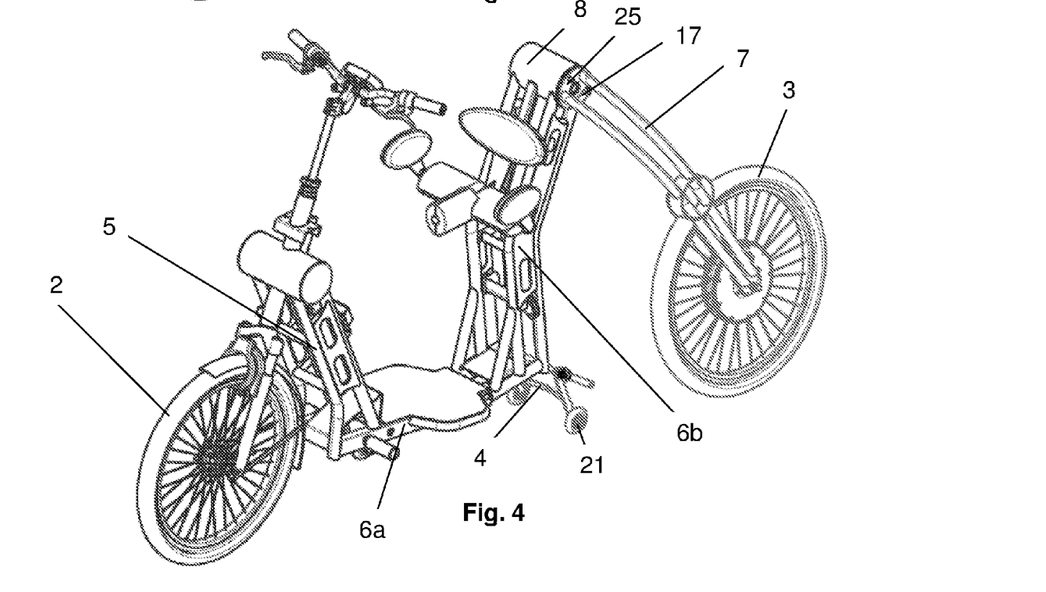
FIG. 4 is a perspective view of the tricycle shown in FIG. 3, wherein the stand is deployed.
Figure 5:
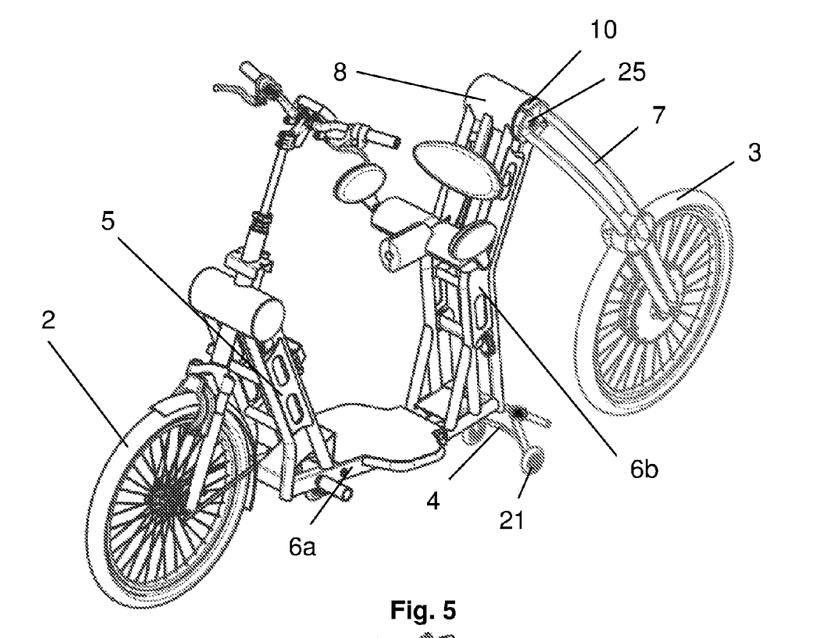
FIG. 5 is a perspective view of the tricycle shown in FIGS. 3 and 4, wherein only one of the two arms is shown, and wherein this arm is located in a third position, where the distance between the corresponding rear wheel and the longitudinal axis of the tricycle is minimal, and where the distance between the front wheel and said rear wheel is maximum.
Figure 6:
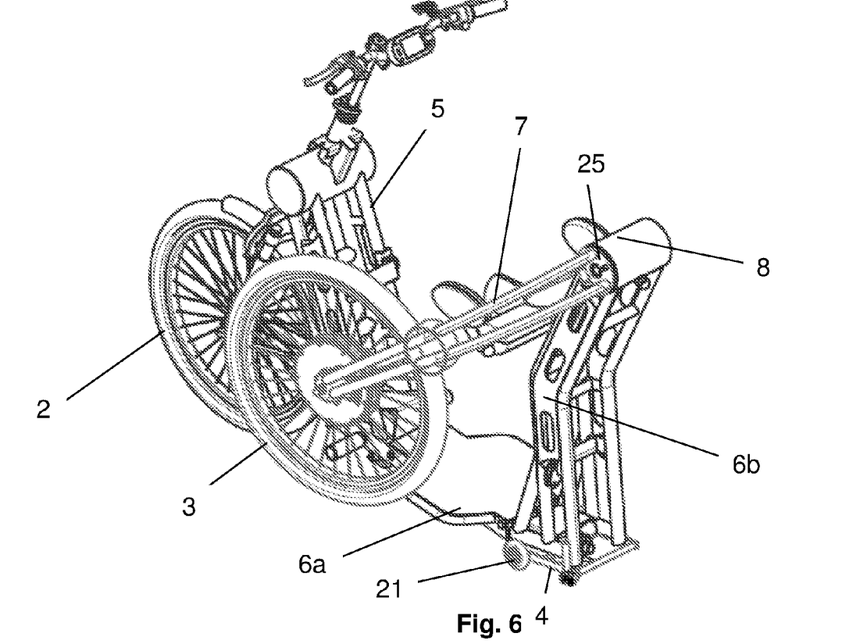
FIG. 6 is a perspective view of a part of the tricycle shown in FIGS. 3 to 5, wherein only one of the two arms is shown, and wherein this arm is located in a fourth position, where the distance between the corresponding rear wheel and the longitudinal axis of the tricycle is maximum, and where the distance between the front wheel and said rear wheel is minimal.
Figure 7:
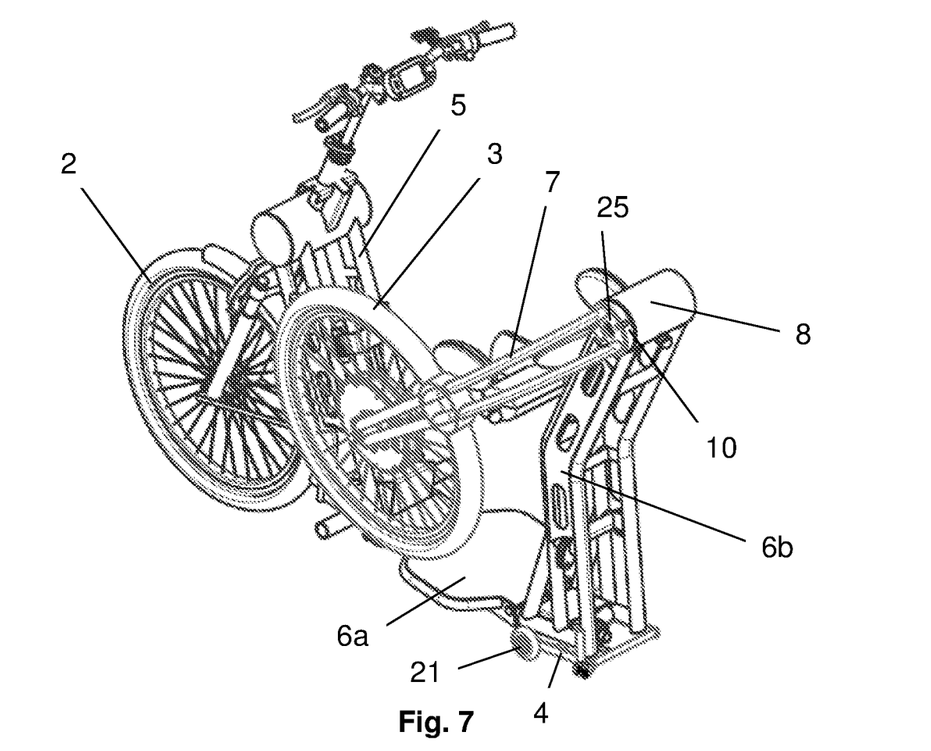
FIG. 7 is a perspective view of a part of the tricycle shown in FIGS. 3 to 6, wherein only one of the two arms is shown, and wherein this arm is located in a second position, where the distance between the corresponding rear wheel and the longitudinal axis of the tricycle is minimal, and where the distance between the front wheel and said rear wheel is minimal.

The tricycle (1) comprises a stand (4) to facilitate movement of the arms (7) relative to the attachment part (8). With this stand (4), it is possible to raise the frame and the rear wheels (3) at the same time, in such a manner that the rear wheels (3) no longer touch the road/ground on which the tricycle (1) moves. The friction between the rear wheels (3) and the road/ground is eliminated when the rear wheels (3) are lifted. This friction would complicate and prevent the movement of the arms (7). The stand (4) is a central stand (4), such that both rear wheels (3) are equally raised. In this manner, the stability of the tricycle (1) is not compromised. The stand (4) is a foldable stand (4) that comprises two wheels (21), where the two wheels (21) are located at the base of the tricycle (1) when the stand (4) is unfolded and raises the frame. In this manner, it is possible to separate the arms (7) from the rest of the frame of the tricycle (1) so they can be stored, without compromising the possibility to roll with the rest of the tricycle (1).

The invention claimed is:

1. A folding tricycle for transporting a person, comprising:
   a front wheel arranged substantially in the longitudinal axis of the tricycle;
   two rear wheels;
   a folding frame joining the wheels;
   wherein the frame comprises
   a front section joining the front wheel;
   a central section;
   a rear section joining the rear wheels;
   the central section comprises an attachment part;
   the rear section comprises two arms, the first end of each arm is connected to said attachment part, and the second end of each arm carries a rear wheel;
   wherein the folding tricycle is configured to do one or more of the following:
   (i) said connection of each arm and the attachment part allows each arm to adopt at least two positions relative to the attachment part, in a first position, the distance between the rear wheels, which corresponds to said arm, and the longitudinal axis of the tricycle is maximum and, in a second position, the distance between said rear wheels and the longitudinal axis of the tricycle is minimal, and wherein, when the two arms are both in said first position or in said second position, the rear wheels are arranged laterally on opposite sides relative to the longitudinal axis of the tricycle, and the tricycle is substantially symmetrical, having a plane of symmetry along the longitudinal axis of the tricycle wherein said connection is designed in such a way that it also enables the distance between the front wheel and said rear wheels to be modified, and that in all positions of the arms, the planes, wherein the rear wheels are located, are substantially parallel to the longitudinal axis of the tricycle and wherein said connection of each arm and the attachment part comprises an intermediate part, the first end of each arm being connected against the attachment part, by means of said intermediate part; or
   (ii) wherein said connection of each of the two arms and the attachment part comprises an intermediate part, a first end of said arms being connected against the attachment part via said intermediate part, and each intermediate part is rotatably connected to the attachment part in such a way that each intermediate part can rotate relative to a rotation axis of the intermediate parts that extends perpendicularly to a plane of symmetry of the tricycle, and each arm is pivotally connected to the corresponding intermediate part in such a way that the arm can rotate relative to an axis of rotation that extends parallel to the plane of symmetry of the tricycle, wherein the intermediate parts are connected by a bar, wherein the attachment part comprises a clamp for blocking the bar in the desired position.

2. The tricycle according to claim 1, wherein the tricycle comprises locking means for blocking said arm with respect to said corresponding intermediate part.

3. The tricycle according to claim 2, wherein the locking means comprise a protruding part that is part of said intermediate part, and a hole of said arm which corresponds to the protruding portion or vice versa, such that in the first position of said arm, the protruding part is housed inside the hole.

4. The tricycle according to claim 1, wherein the tricycle comprises locking means for blocking the intermediate part relative to the attachment part.

5. The tricycle according to claim 1, wherein the attachment part has two surfaces, wherein the planes of the two surfaces extend parallel to each other at equal distances from the plane of symmetry of the tricycle and extend parallel to the plane of symmetry of the tricycle, and the intermediate parts are connected rotatably to said corresponding surfaces of the attachment part.

6. The tricycle according to claim 5, wherein the surfaces of the attachment part are circular surfaces having the same dimensions, and the intermediate parts have circular surfaces having said same dimensions which are formed so as to permit shape adjustment with said surfaces of the attachment part, and the intermediate parts are connected to said corresponding surfaces of the attachment part around a pivot that is located at the center of said corresponding surfaces of the attachment part.

7. The tricycle according to claim 5, wherein said bar is located at a certain distance from the axis of rotation of the intermediate parts, and said surfaces of the attachment part comprise slots at said distance from the axis of rotation of the intermediate parts to ensure the connection between the bar and the intermediate parts, and to ensure the rotation of the intermediate parts relative to the axis of rotation of the intermediate parts, in which the dimensions of the slots are limited so as to limit the rotation.

8. The tricycle according to claim 1, wherein each arm has connecting surfaces, and each intermediate part has connecting surfaces complementary to the connecting surfaces of the arms, and each arm is pivotally connected by a hinge pin to the corresponding intermediate part, in which the hinge pin is located on the outer edge of the connecting surface of the arm and, in said first position of the arms, said connecting surfaces of the arms and said connecting surfaces of the intermediate parts are placed against each other.

9. The tricycle according to claim 1, wherein each arm is detachably connected to the corresponding intermediate part.

10. The tricycle according to claim 1, wherein the frame comprises a stand.

11. The tricycle according to claim 10, wherein the stand is a central stand.

12. The tricycle according to claim 11, wherein the central stand comprises two wheels, wherein the two wheels are located at the base of the tricycle when the central stand raises the frame.

13. The tricycle according to claim 1, wherein, in said first position of the arms, the plane wherein the corresponding rear wheel is located intersects the plane of symmetry of the tricycle at a height which lies above said rear wheel.

14. A folding tricycle for transporting a person, comprising:

a front wheel arranged substantially in the longitudinal axis of the tricycle;
two rear wheels;
a folding frame joining the wheels;
wherein the frame comprises
a front section joining the front wheel;
a central section;
a rear section joining the rear wheels;
wherein
the central section comprises an attachment part;
the rear section comprises two arms, the first end of each arm is connected to said attachment part, and the second end of each arm carries a rear wheel, wherein said connection of each of the two arms and the attachment part comprises an intermediate part, the first end of each arm being connected against the attachment part, by means of said intermediate part;
each intermediate part is rotatably connected to the attachment part in such a way that each intermediate part can rotate relative to a rotation axis of the intermediate parts that extends perpendicularly to a plane of symmetry of the tricycle;
each arm is pivotally connected to the corresponding intermediate part in such a way that the arm can rotate relative to an axis of rotation that extends parallel to the plane of symmetry of the tricycle;
wherein the intermediate parts are connected by a bar, and said bar is located at a certain distance from the axis of rotation of the intermediate parts, wherein surfaces of the attachment part comprise slots at said certain distance from the axis of rotation of the intermediate parts in order to ensure the connection between the bar and the intermediate parts, and to ensure the rotation of the intermediate parts relative to the axis of rotation of the intermediate parts, in which the dimensions of the slots are limited so as to limit the rotation.

15. A folding tricycle for transporting a person, comprising:

a front wheel arranged substantially in the longitudinal axis of the tricycle;
two rear wheels;
a folding frame joining the wheels;
wherein the frame comprises
a front section joining the front wheel;
a central section;
a rear section joining the rear wheels;
wherein
the central section comprises an attachment part;
the rear section comprises two arms, the first end of each arm is connected to said attachment part, and the second end of each arm carries a rear wheel;
wherein said connection of each arm and the attachment part allows each arm to adopt at least two positions relative to the attachment part, in a first position, the distance between the rear wheel, which corresponds to said arm, and the longitudinal axis of the tricycle is maximum and, in a second position, the distance between said rear wheel and the longitudinal axis of the tricycle is minimal, and wherein, when the two arms are both in said first position or in said second position, the rear wheels are arranged laterally on opposite sides relative to the longitudinal axis of the tricycle, and the tricycle is substantially symmetrical, having a plane of symmetry along the longitudinal axis of the tricycle wherein said connection is designed in such a way that it also enables the distance between the front wheel and said rear wheel to be modified, and that in all positions of the arms, the planes, wherein the rear wheels are located, are substantially parallel to the longitudinal axis of the tricycle and wherein said connection of each arm and the attachment part comprises an intermediate part, the first end of each arm being connected against the attachment part, by means of said intermediate part.

* * * * *